United States Patent [19]

Toshihiko et al.

[11] Patent Number: 4,915,571

[45] Date of Patent: Apr. 10, 1990

[54] DEVICE FOR LOADING CANS, BOTTLES, OR THE LIKE INTO A DISPENSING MECHANISM

[75] Inventors: Ozaki Toshihiko; Kuribara Toshihiko, both of Isesaki, Japan

[73] Assignee: Sanden Corporation, Gunma, Japan

[21] Appl. No.: 129,296

[22] Filed: Dec. 7, 1987

[30] Foreign Application Priority Data

May 12, 1986 [JP] Japan .......................... 61-187791[U]

[51] Int. Cl.[4] .......................... B65G 59/06; A47F 5/01

[52] U.S. Cl. .................................. 414/414; 414/403; 211/59.2; 312/45; 206/139

[58] Field of Search ............... 221/129, 283, 309, 131, 221/193, 251, 282, 151, 312 B; 414/403, 414, 199, 207, 208; 211/59.2, 49.1; 312/45, 72; 222/556, 557, 175, 517; 206/139

[56] References Cited

U.S. PATENT DOCUMENTS

| | | | |
|---|---|---|---|
| 295,233 | 3/1884 | Dall | 222/556 |
| 655,967 | 8/1900 | Felton | 222/556 |
| 790,852 | 5/1905 | Piza | 222/556 |
| 1,023,116 | 4/1912 | Bailey | 312/45 X |
| 1,906,126 | 4/1933 | Mott | 414/414 |
| 1,937,232 | 11/1933 | Kuehling | 222/556 |
| 2,110,518 | 3/1938 | Becker | 222/556 |
| 2,126,950 | 7/1938 | Ditchfield | 222/556 |
| 2,599,618 | 6/1952 | Dempster | 222/556 |
| 2,630,941 | 3/1953 | Cappellini | 222/556 |
| 2,641,477 | 6/1953 | Davis et al. | 222/556 |
| 2,662,671 | 12/1953 | Almas | 222/556 |
| 2,677,483 | 5/1954 | Shaw | 222/556 |
| 3,033,396 | 5/1962 | Storey | 414/414 |
| 3,075,652 | 1/1963 | McCoy | 414/414 X |
| 3,178,242 | 4/1965 | Ellis et al. | 312/45 |
| 3,187,961 | 6/1965 | Moore | 222/556 |
| 3,399,793 | 9/1968 | Walker et al. | 414/403 X |
| 3,486,647 | 12/1969 | Seragnoli | 414/414 |
| 3,499,557 | 3/1970 | Walzel | 222/556 |
| 3,883,017 | 5/1975 | Shirai et al. | 414/403 X |
| 4,098,383 | 7/1978 | Carpman | 312/45 X |
| 4,105,126 | 8/1978 | Deffner et al. | 211/59.2 |
| 4,401,242 | 8/1983 | Bonomo | 222/556 |
| 4,405,059 | 9/1983 | Kull | 221/129 |
| 4,485,937 | 12/1984 | Adams | 221/129 |
| 4,498,569 | 2/1985 | Tanaka et al. | 312/45 X |
| 4,744,489 | 5/1988 | Binder et al. | 312/45 X |

FOREIGN PATENT DOCUMENTS

| | | | |
|---|---|---|---|
| 243627 | 2/1912 | Fed. Rep. of Germany | 222/556 |
| 2443732 | 3/1975 | Fed. Rep. of Germany | 222/556 |

OTHER PUBLICATIONS

Japanese Utility Model Publication #61-42682 Date. 3/19/1986.

*Primary Examiner*—Frank E. Werner
*Assistant Examiner*—Robert S. Katz
*Attorney, Agent, or Firm*—Banner, Birch, McKie & Beckett

[57] ABSTRACT

A device for loading cans, bottles, or similar containers into a dispensing mechanism of a vending machine is disclosed. The device includes a rectangular box having a receiving opening and a discharge opening. The rectangular box temporarily stores the containers and includes a cover plate to control the opening and closing of the discharge opening. The cover plate is manually controlled by a control mechanism. The receiving box is also provided with a guide portion which extends into the open loading space of a dispensing mechanism of an automatic vending machine to facilitate the loading operation.

10 Claims, 3 Drawing Sheets

DEVICE FOR LOADING CANS, BOTTLES, OR THE LIKE INTO A DISPENSING MECHANISM

TECHNICAL FIELD

The present invention relates to a device for loading beverage cans, bottles, or other containers into the dispensing mechanism of an automatic vending machine.

BACKGROUND OF THE INVENTION

Generally, automatic vending machines are provided with a plurality of dispensing mechanisms for storing and discharging the products individually in accordance with a vending signal. If the merchandise stored in a dispensing mechanism is sold out, additional merchandise should be loaded into the dispensing mechanism which stores a large plurality of containers.

Packaged beverage products, particularly a plurality of juice or carbonated drink cans or bottles, are normally packed in one carton to reduce packaging costs and minimize damage to the cans or bottles during transportation. After opening the package, the cans or bottles are manually and individually loaded into the dispensing mechanism of the vending machine through an open loading space in the dispensing mechanism. The loading operation should be conducted as fast as possible to permit reloading a maximum number of containers within a dispensing mechanism and to permit reloading a maximum number of dispensing mechanisms within a given time period. However, this loading operation is necessarily time consuming and fatigues the operator. Also, the dispensing mechanism is normally provided with an open loading space at its upper portion. Therefore, each can or bottle is individually carried to the upper portion of the dispensing mechanism.

One solution to improve the loading operation of a dispensing mechanism, particularly the carrying of cans or bottle to the open loading space at the upper portion, is disclosed in Japanese Utility Model Publication No. 61-42682. In this Japanese application, a couple of can or bottles are placed on a hold/guide member from an open carton. The hold/guide member is positioned on the open loading space of the dispensing mechanism and the cans or bottles are loaded into the dispensing mechanism. Because the hold/guide member holds a limited number of cans or bottles, the loading operation is not adequately improved.

SUMMARY OF THE INVENTION

It is a primary object of the present invention to provide a device for loading cans, bottles, or other beverage containers which improves the loading operation of the dispensing mechanism and which reduces operator fatigue.

It is another object of the present invention to provide a device for easy loading cans, bottles, or other beverage containers into a dispensing mechanism.

A device for loading cans, bottles, or other beverage containers in accordance with this invention includes a receiving box portion having receiving and discharge openings. The receiving box portion temporarily stores cans, bottles, or the like, and also includes a cover element for the discharge opening. The receiving box portion is provided with a guide portion for introducing the cans, bottles, or the like into the open loading space of a dispensing mechanism from the receiving box portion through its discharge opening. The discharge opening is normally covered by a pivotably supported cover plate. The cover plate controls the opening and closing of the discharge opening in accordance with the operation of a manually operated control mechanism. Therefore, cans, bottles, or other containers stored in the receiving box portion are easily disposed in the dispensing mechanism through the open loading space by the operation of the control mechanism for the cover plate.

Various additional advantages and features of novelty which characterize the invention are further pointed out in the claims that follow. However, for a better understanding of the invention and its advantages, reference should be made to the accompanying drawings and descriptive matter which illustrate and describe the preferred embodiment of the invention.

DETAILED DESCRIPTION OF THE PREFERRED EMBODIMENT

Figure 1:
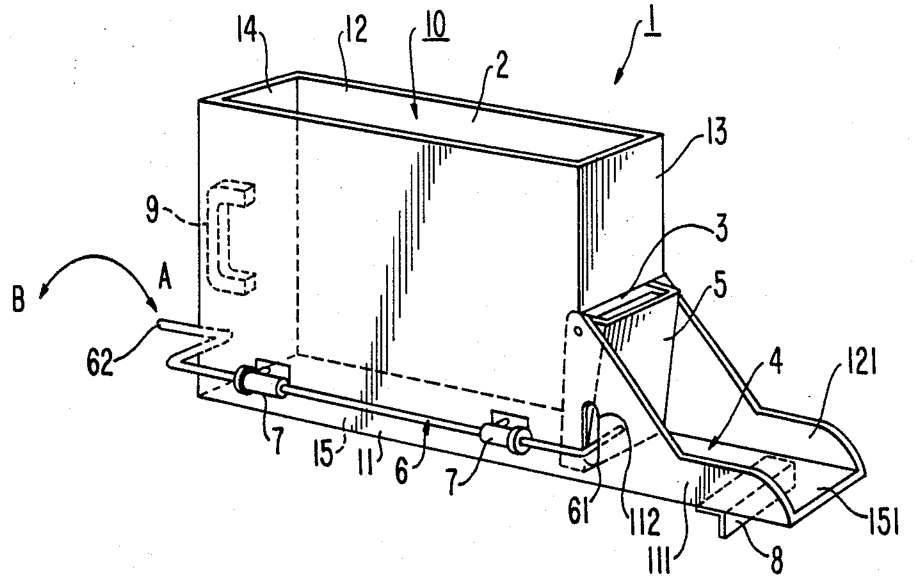
FIG. 1 is a perspective view of a loading device in accordance with the present invention.

Referring to FIG. 1, a loading device in accordance with the present invention is shown. Loading device 1 includes receiving box 10 which is provided with an upper opening 2 and a lower discharge opening 3. Receiving box 10 includes right and left side plates 11, 12, front plate 13, rear plate 14, and bottom plate 15. Side plates 11, 12 and front and rear plates 13, 14 define a rectangular container with the bottom space covered by bottom plate 15. Merchandise M such as cans, bottles, or other beverage containers, may be temporarily stored within the interior of rectangular box 10.

A lower half of front plate 13 is removed to define discharge opening 3. Side plates 11, 12 and bottom plate 15 extend forwardly beyond front plate 13 and surround discharge opening 3 with guide portion 4. Flange portions 111 and 121, projecting from the front edges of side plates 11, 12, respectively, and extending portion 151 of bottom plate 15, form guide portion 4. Guide portion 4 functions to guide merchandise M discharged from discharge opening 3 into dispensing mechanism 31 of an automatic vending machine.

Discharge opening 3 is covered by cover plate 5 which is pivotably supported on two side plates 11, 12. Pivoting of cover plate 5 is controlled by control element 6. Discharge opening 3 is controllably opened only while merchandise M is loaded into dispensing mechanism 31. As shown in FIG. 1, control element 6 for cover plate 5 is a crank arm element rotatably supported on one side plate 11 through bearing sleeves 7. One terminal end of control element 6 functions as holding portion 61 for cover plate 5. Holding portion 61 extends through rectangular hole 112 on flange portion 111 of side plate 11 and is disposed adjacent cover plate 5 to restrict the pivoting movement of cover plate 5. Also, the opposite end portion of control element 6 functions as operating portion 62 which is manually rotated to control the position of holding portion 61 and therefore to control the opening and closing of discharge opening 3. Operating portion 62 rotates from position A in which cover plate 5 closes discharge opening 3, to position B in which cover plate 5 opens discharge opening 3.

A mounting device such as stopper element 8 is fixed on the bottom surface of extending portion 151 of bottom plate 15 to hold loading device 1 steady during the loading operation. Handle 9 is formed on rear plate 14 for carrying loading device 1.

Figure 3A:
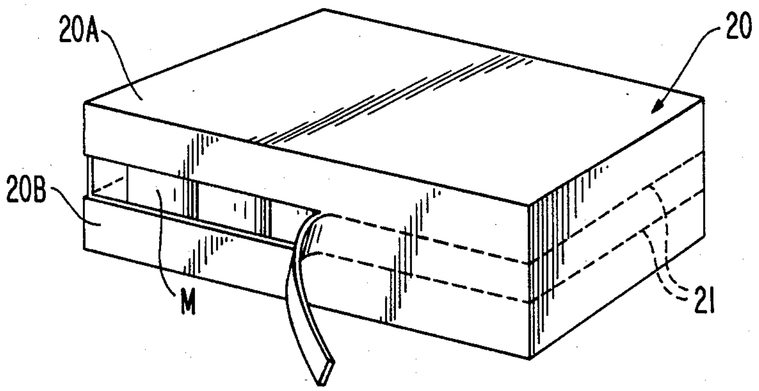
FIGS. 3*a*–3*d* are diagramatic views illustrating the process of disposing beverage cans into the loading device.
Figure 3B:
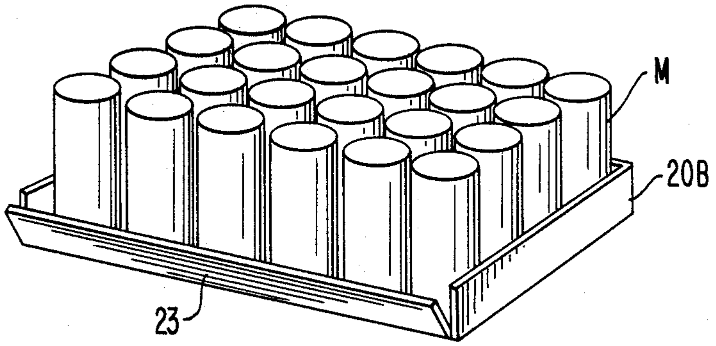
Figure 3C:
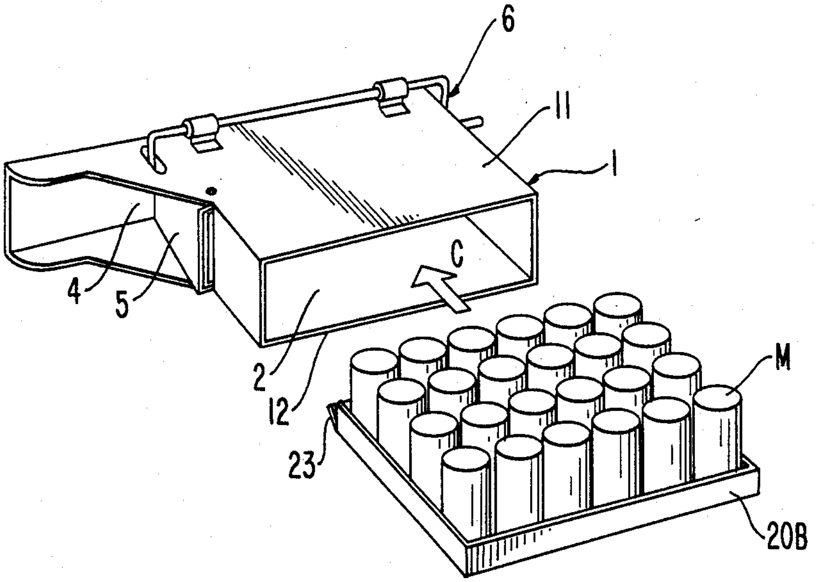
Figure 3D:
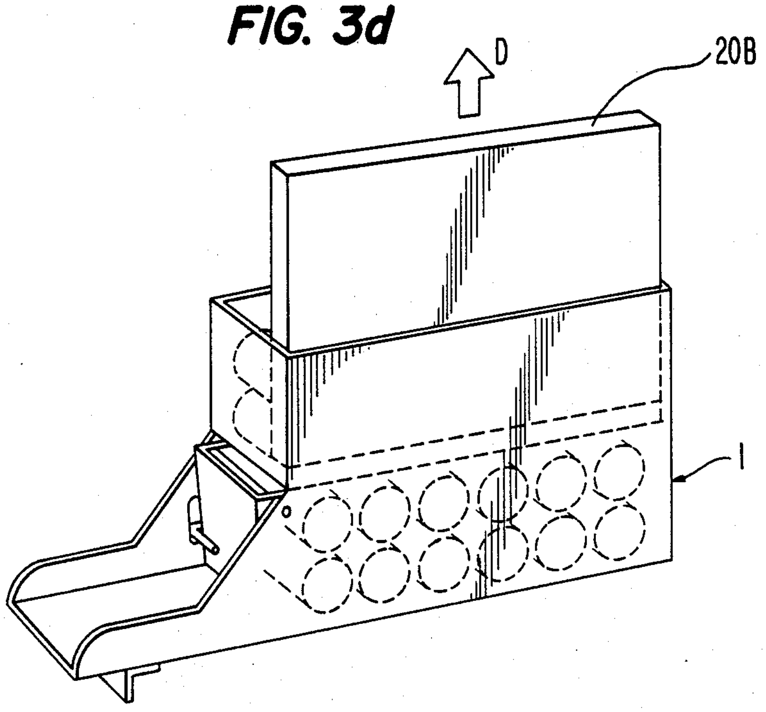

The operation of loading device 1 will be described with reference to FIG. 3. Merchandise M, shown as cans, is normally packed in a single carton 20 frequently in quantities of twenty-four cans per carton. Multiple cartons are shipped to the desired market. Carton 20 has notches 21 at its central portion to enable carton 20 to be separated into two halves, upper case 20*a* and lower case 20*b*, as shown in FIG. 3*a*. Thereafter, upper case 20*a* is removed, although lower case 20*b* alternately may be removed. Next, both side corners of one side surface of the remaining lower case 20*b* are broken to form tongue-shaped portion 23, as shown in FIG. 3*b*. Then, loading device 1 is disposed adjacent lower case 20*b* as shown in FIG. 3*c* so that one side plate forms a bottom portion. Merchandise M disposed in lower case 20*b* is fully placed in receiving box 10 together with lower case 20 through upper opening 2 of loading device 1. The direction of movement of lower case 20*b* and merchandise M relative loading device 1 is indicated by arrow C in FIG. 3*c*. At this time, merchandise M disposed in lower case 20*b* is stacked in receiving box 10 so that the top and bottom surfaces of merchandise M are disposed adjacent side plates 11, 12 of receiving box 10. After all merchandise M together with lower case 20*b* is disposed within receiving box 10, loading device 1 is reoriented in a vertical position as shown in FIG. 3*d*, and lower case 20*b* is removed from receiving box 10, as shown by arrow D. Removal of lower case 20*b* is allowed by tongue-shaped portion 23. As a result, merchandise M packed into one carton is easily disposed in receiving box 10 of loading device 1.

Figure 2:
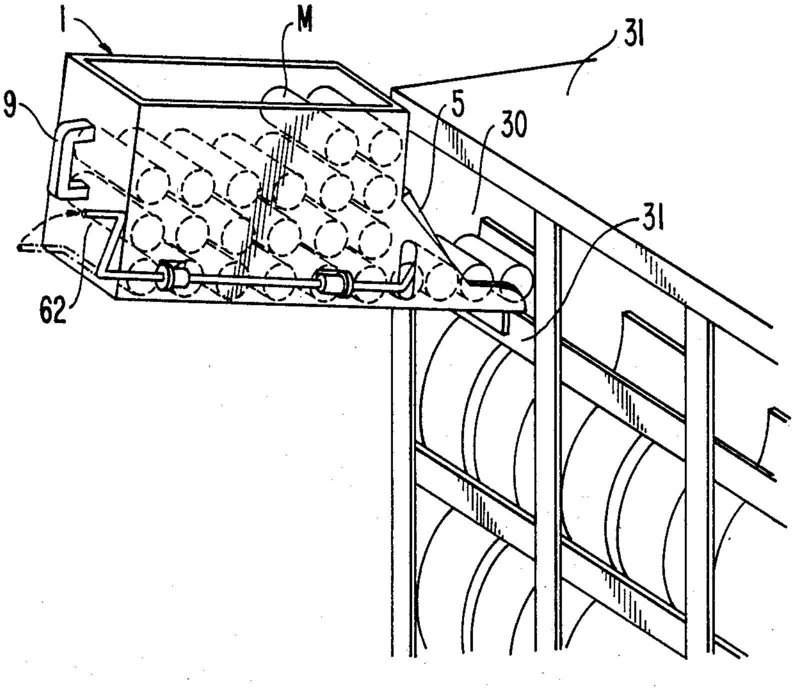
FIG. 2 is a perspective view illustrating the loading operation of a dispensing mechanism using the loading device of FIG. 1.

Finally, loading device 1 containing merchandise M is positioned on open loading space 30 of dispensing mechanism 31, as shown in FIG. 2. An automatic vending machine (not shown) is provided with a plurality of dispensing mechanisms 31, each of which is formed with merchandise open loading space 30 at its upper portion. When stopper element 8 is placed against a portion of dispensing mechanism 31, guide portion 4 of loading device 1 is positioned on open loading space 30 of dispensing mechanism 31 to facilitate dispensing. When cover plate 5 opens discharge opening 3 of loading device 1 due to the operation of control element 6, merchandise M in loading device 1 rolls into dispensing mechanism 31 through guide portion 4 and open loading space 30. In this loading operation, the operator need only hold the loading device until merchandise M is fully loaded into dispensing mechanism 31. The loading of merchandise M from loading device 1 to dispensing mechanism 31 is an easy procedure.

Numerous characteristics and advantages of the invention have been described in detail in the foregoing description with reference to the accompanying drawings. However, the disclosure is illustrative only and the invention is not limited to precise illustrated embodiment. Various changes and modifications may be effected therein by one skilled in the art without departing from the scope or spirt of the invention.

We claim:

1. A device for loading merchandise into a dispensing mechanism of an automatic vending machine comprising:
   - a receiving box for temporarily holding said merchandise, said receiving box having a receiving opening and a discharge opening;
   - a cover element pivotally supported on the receiving box to controllably open and close said discharge opening;
   - a guide including a portion disposed on said receiving box beneath said cover element and extending from said discharge opening for guiding merchandise into the dispensing mechanism; and
   - a control mechanism to control the pivotal movement of said cover element to open and close said discharge opening, said control mechanism comprising a crank arm movably supported on said receiving box with one end of said crank arm being received through a slot formed in a flange portion of said guide when said crank arm is in a first position.

2. The loading device as set forth in claim 1 wherein said receiving box further comprises a pair of side plates, a front plate, a rear plate and a bottom plate, said receiving opening being formed opposite said bottom plate on an upper portion of said receiving box, and said discharge opening being formed in said front plate.

3. The loading device as set forth in claim 1 wherein said crank arm is movable from said first position wherein said crank arm restricts movement of said cover element to a second position wherein said cover element is free to move and open said discharge opening in response to the force of the merchandise thereon.

4. The loading device as set forth in claim 1 further comprising a mounting device extending from said receiving box for securely holding said loading device adjacent the dispensing mechanism during the loading operation.

5. A portable device for loading merchandise into a dispensing mechanism of an automatic vending machine comprising:
   - a receiving box capable of temporarily holding merchandise comprising a pair of side plates, a front plate, a rear plate and a bottom plate, said receiving box further comprising a receiving opening opposite the bottom plate and a discharge opening adjacent to the front plate;
   - a cover element pivotally supported on the receiving box adjacent to the front plate, said cover element extending over the discharge opening when in a first position;
   - guide means extending from said receiving box and beyond said cover element for guiding merchandise from the receiving box into a dispensing mechanism of an automatic vending machine; and
   - control means disposed on said receiving box for controlling the pivotal movement of said cover element from said first position to a second position, said control means comprising a crank arm rotatably supported on said receiving box, said crank arm having one end extending through a slot formed in said guide means when said crank arm is rotated to engage said cover element.

6. The loading device of claim 5 further including a U-shaped handle extending from said rear plate.

7. The loading device of claim 5 wherein said guide means includes a planar portion substantially parallel with said bottom plate and flange portions extending therefrom.

8. The loading device of claim 5 further including a mounting device extending from said guide means and adapted for mounting said loading device on the dispensing mechanism during loading.

9. The loading device of claim 5 wherein said guide means includes a planar portion and flange portions extending therefrom, said slot being formed in one of said flange portions.

10. The loading device of claim 5 wherein said control means is rotatably supported on one of said side plates.

* * * * *

UNITED STATES PATENT AND TRADEMARK OFFICE
CERTIFICATE OF CORRECTION

PATENT NO. : 4,915,571

DATED : April 10, 1990

INVENTOR(S) : Toshihiko Ozaki et al.

It is certified that error appears in the above-identified patent and that said Letters Patent is hereby corrected as shown below:

ON TITLE PAGE: Section [19], delete "Toshihiko" and insert —Ozaki—;
Section [75], Inventors: delete in its entirety and insert —Toshihiko Ozaki; Toshihiko Kuribara, both of Isesaki, Japan—;

Column 1, line 17, delete "large";
Column 1, line 18, delete "Packaged" and insert —A plurality of packaged—;
Column 1, lines 18-19, delete "a plurality of";
Column 1, line 22, delete "package," and insert —carton,—;
Column 1, line 38, delete "bottle" and insert —bottles—;
Column 1, line 40, delete "can" and insert —cans—;
Column 1, line 56, delete "easy" and insert —easily—;
Column 3, line 24, delete "20" and insert —20b—;
Column 3, line 32, after "all" insert —of—;
Column 3, line 64, after "to" insert —the—.

Signed and Sealed this

Thirteenth Day of August, 1991

*Attest:*

HARRY F. MANBECK, JR.

*Attesting Officer*

*Commissioner of Patents and Trademarks*